(12) United States Patent
Kotulla et al.

(10) Patent No.: US 7,637,513 B2
(45) Date of Patent: Dec. 29, 2009

(54) VEHICLE SUSPENSION SYSTEM

(75) Inventors: Marcus Kotulla, Wilga (AU); Richard Monk, Busselton (AU)

(73) Assignee: Kinetic Pty. Limited, Dunsborough (AU)

( * ) Notice: Subject to any disclaimer, the term of this patent is extended or adjusted under 35 U.S.C. 154(b) by 573 days.

(21) Appl. No.: 10/490,695

(22) PCT Filed: Sep. 30, 2002

(86) PCT No.: PCT/AU02/01331

§ 371 (c)(1),
(2), (4) Date: Jul. 26, 2004

(87) PCT Pub. No.: WO03/029036

PCT Pub. Date: Apr. 10, 2003

(65) Prior Publication Data

US 2004/0245732 A1 Dec. 9, 2004

(30) Foreign Application Priority Data

Sep. 28, 2001 (AU) .................................. PR8013

(51) Int. Cl.
*B60C 21/005* (2006.01)
(52) U.S. Cl. .................... 280/124.106; 280/124.157
(58) Field of Classification Search .......... 280/124.106, 280/124.16, 124.157, 124.158, 124.159, 280/5.5, 5.506, 5.508
See application file for complete search history.

(56) References Cited

U.S. PATENT DOCUMENTS

| | | | | | |
|---|---|---|---|---|---|
| 2,184,202 | A | * | 12/1939 | Tschanz | ................... 280/5.506 |
| 3,550,992 | A | * | 12/1970 | Grancon | ................... 280/6.157 |
| 3,752,497 | A | * | 8/1973 | Enke et al. | ................ 280/5.509 |
| 3,918,739 | A | | 11/1975 | Kirkland | |
| 4,168,075 | A | | 9/1979 | Matschinsky | |
| 4,206,935 | A | * | 6/1980 | Sheppard et al. | ......... 280/5.508 |
| 4,765,649 | A | * | 8/1988 | Ikemoto et al. | ............ 280/5.51 |
| 4,948,164 | A | * | 8/1990 | Hano et al. | .............. 280/5.508 |
| 5,040,823 | A | | 8/1991 | Lund | |

(Continued)

FOREIGN PATENT DOCUMENTS

DE 20 48 323 4/1972

(Continued)

OTHER PUBLICATIONS

Derwent Abstract Accession No. 90-020674/03, SU 1470574 A (LVOV Poly) Apr. 7, 1989.

(Continued)

*Primary Examiner*—Paul N. Dickson
*Assistant Examiner*—Timothy Wilhelm
(74) *Attorney, Agent, or Firm*—Harness, Dickey & Pierce, PLC

(57) ABSTRACT

A method of controlling the roll stiffness and roll moment distribution of a vehicle suspension system of a vehicle, the vehicle suspension system including front and rear vehicle support means for supporting the vehicle and any load carried by the vehicle, and at least one roll moment reaction means for providing a variable roll stiffness for the vehicle suspension system;

The method including the step of adjusting the roll stiffness and the roll moment distribution of the vehicle suspension system in dependence on the load carried by at least a rear or front of the vehicle.

36 Claims, 6 Drawing Sheets

U.S. PATENT DOCUMENTS

| | | | | |
|---|---|---|---|---|
| 5,178,406 | A | * | 1/1993 | Reynolds .............. 280/124.106 |
| 5,630,623 | A | * | 5/1997 | Ganzel ................. 280/124.106 |
| 5,678,846 | A | * | 10/1997 | Davis ................... 280/124.157 |
| 5,794,966 | A | * | 8/1998 | MacLeod .................. 280/5.507 |
| 6,010,139 | A | * | 1/2000 | Heyring et al. ......... 280/124.104 |
| 6,428,024 | B1 | * | 8/2002 | Heyring et al. ......... 280/124.106 |
| 6,519,517 | B1 | * | 2/2003 | Heyring et al. ................. 701/37 |
| 6,761,371 | B1 | * | 7/2004 | Heyring et al. ......... 280/124.157 |
| 6,929,271 | B2 | * | 8/2005 | Trotter et al. .......... 280/124.106 |

FOREIGN PATENT DOCUMENTS

| | | | |
|---|---|---|---|
| DE | 28 44 028 | A1 | 4/1978 |
| DE | 27 26 097 | A1 | 12/1978 |
| DE | 37 08 806 | | 6/1988 |
| EP | 492 468 | A2 | 7/1992 |
| EP | 512 358 | A1 | 11/1992 |
| FR | 2 626 819 | A1 | 8/1989 |
| JP | 60-46315 | | 4/1985 |
| JP | 06147963 | A * | 5/1994 |

OTHER PUBLICATIONS

International Search Report—PCT/AUO2/01331; ISA/AU; Mailed: Oct. 22, 2002.

Final Office Action issued in corresponding JP Application No. 2003-532321 dated Sep. 30, 2008 with English explanation.

Supplementary European Search Report dated Jul. 9, 2007.

* cited by examiner

VEHICLE SUSPENSION SYSTEM

CROSS-REFERENCE TO RELATED APPLICATIONS

This application is a National Stage of International application No. PCT/AU02/01331, filed Sep. 30, 2002 and published in English on Apr. 10, 2003 as International Application No. WO 03/029036 A1. This application claims the benefit of Australian Application No. PR 8013 filed Sep. 28, 2001. The disclosure(s) of the above applications are incorporated herein by reference.

The present invention is directed towards a method for optimising vehicle suspension system stiffness, more particularly, for adjusting the roll stiffness and the roll moment distribution of the suspension in dependence on the load carried by the vehicle.

There is presently a trend in advanced car suspension systems towards anti-roll systems which can actively adjust the body roll angle, roll stiffness and the roll moment distribution of the vehicle in dependence on sensed conditions, such as steering angle and/or rate, roll angle, lateral acceleration, vehicle speed, yaw rate, and other inputs. The purpose of the active control is to allow for a low or negligible roll stiffness from the anti-roll bars of the suspension in straight line running, and provide control of the roll angle and roll load distribution front to rear during cornering to provide control of the handling balance of the vehicle. These systems can be integrated into electronic stability control systems to help control the traction of each wheel and the yaw rate of the vehicle to improve stability.

There is also a trend towards simple switchable roll stiffness systems and intelligently designed, interconnected passive systems. The interconnected passive systems can improve comfort and stability by decoupling the roll and warp modal stiffnesses. This means that a single wheel input does not wind up the roll stiffness means at one end of the vehicle only. As the roll stiffness means are interconnected, the input causes a load change in the roll stiffness means at each end of the vehicle, which helps distribute the loads into the vehicle, reduce the peak loads at the input point and reduce the change in effective roll moment distribution due to the way the input loads are shared between the wheels. The handling balance is therefore improved over bumps in corners and comfort is improved through a reduction in the forces input to the body, which would otherwise cause high accelerations.

However, for some vehicle types, such as trucks, which have a large variance in payload, the large difference between the roll stiffness required for the fully laden condition and that required when partially loaded or unladen can mean that a variable roll stiffness system is desirable—the mass and inertia of the vehicle is quite different from the unladen to the laden condition. For example, if a constant roll stiffness (measured in say Nm/degree) is provided for all load conditions, this must be set high enough to give the desired roll stiffness when fully laden, so when the vehicle is unladen, its significantly reduced mass and inertia means a given bump in the road surface deflects the tyre and the suspension less than when the vehicle is laden, thereby producing higher accelerations of the vehicle body in the unladen state. When the load is carried high up (ie there is a very large roll moment), the stability of these types of vehicles is primarily dependent on the roll moment distribution (as well as the roll stiffness) of the suspension. If the distribution of roll loads on the wheels does not match the load distribution of the vehicle, then a wheel will lift at one end of the vehicle before the other. This premature lifting of one wheel causes a reduction in roll stiffness and the vehicle will roll over at a lower lateral acceleration level than if the wheels at both ends of the vehicle lifted together. As the position of the centre of mass of the payload typically varies in the fore-aft direction along the vehicle, the roll moment distribution required to maximise the lateral acceleration level at which the vehicle will roll over will vary correspondingly.

It is therefore an object of the present invention to provide a vehicle suspension system which changes its roll stiffness and roll moment distribution with load.

With this in mind, according to one aspect of the present invention, there is provided a method of controlling the roll stiffness and roll moment distribution of a vehicle suspension system of a vehicle, the vehicle suspension system including front and rear vehicle support means for supporting the vehicle and any load carried by the vehicle, and at least one roll moment reaction means for providing a variable roll stiffness for the vehicle suspension system;

the method including the step of adjusting the roll stiffness at both rear and front of the vehicle and the roll moment distribution of the vehicle suspension system in dependence on the load carried by at least the rear or front of the vehicle.

It may not be possible or desirable to maintain a constant roll rate (typically measured in degrees/g) or vary the roll moment distribution to ensure that the roll wheel loads always match the load distribution of the vehicle for maximised lateral acceleration prior to roll-over, but ideally, for uncomfortable, unstable vehicles, the roll stiffness and roll moment distribution can be varied to improve the overall performance of the suspension system by trending in the right directions. This principle shows the most remarkable improvements on trucks of any type, from rigid cab-box trucks through to articulated vehicles with a prime mover (or tractor unit) and at least one trailer. In the case of articulated vehicles, the roll moment distribution of the whole assembly (the prime mover and trailer(s) together) is important to the roll-over stability of the assembly.

The rear of the vehicle may be supported on mechanical springs, for example leaf springs, which compress or extend as load is added to or removed from the rear of the vehicle. Displacement sensing means may be provided for the rear axle to enable a time-averaged displacement to be ascertained and used to determine the load on the rear axle. Two displacement sensing means may be provided at two laterally spaced points for the rear axle to enable the lateral offset of the load to be determined. If the spacing of the leaf springs is known (as it is for a particular vehicle) and the relative position and spacing of the two displacement sensors (sensing displacement of the axle relative to the frame), the vertical deflection of each leaf spring can be simply calculated. As the stiffness of the leaf springs should also be known, the magnitude of the calculated deflection of each leaf spring can be used to ascertain the load on each leaf spring. As some arrangements of locating leaf springs can add additional roll stiffness (more than the vertical stiffness and spacing of the leaf springs would suggest), this offset can also be factored into the calculation of load on each leaf spring, giving two laterally spaced loads, indicative of the offset of the load position from the vehicle centre-line.

Alternatively the rear of the vehicle may be supported (at least partially) by at least one rear fluid support means. This fluid support means could typically be an air spring or a hydraulic cylinder. As the pressure in the rear fluid support means is related to the load on the rear axle of the vehicle, the roll stiffness and roll moment distribution of the suspension may be regulated in dependence on the pressure in the rear fluid support means. Normally two air springs are provided, one on the left and one on the right hand side of the vehicle. These may be independently controlled or interconnected either with a small diameter pressure line for levelling (this is currently the most common arrangement) or a larger diameter pressure line to reduce or remove the dynamic roll stiffness of the support means.

Although the above paragraphs have discussed only the rear axle, they are equally applicable to the front axle. Ideally, the loads on the front and rear of the vehicle would be known, so both the magnitude and the fore-aft position of the load can be ascertained. Then the roll stiffness and roll moment distribution can be adjusted to provide the desired balance between comfort and roll over threshold for the measured magnitude and fore-aft position of the load. One method of doing this is front and rear air suspension with adjustable stiffness bars. The pressure in the front and rear air springs can be used to determine the magnitude and fore-aft position of the load. A control system can then adjust the stiffness of the front and rear roll moment reaction means to provide the desired roll stiffness at each end of the vehicle, therefore controlling overall roll stiffness and roll moment distribution. The roll moment reaction means can be provided by a wide variety of different possible arrangements. For example, the roll moment reaction means can be:

1) an anti-roll bar with adjustable stiffness through using at least two hydraulic chambers which can work against a resilient accumulator, the chambers varying in volume inversely proportionally to each other and displacing in a direction depending on the roll moment. The operating pressure in the cylinders and accumulators can be varied with load to vary the effective stiffness of the anti-roll bar. There are a number of ways in which this arrangement can be embodied. For example, at least one dropper on the anti-roll bar may be replaced with a double acting hydraulic cylinder to give the two hydraulic chambers. Alternatively a cylinder may be used to control the relative position of one of the wheel arms of the anti-roll bar with respect to the rest of the bar, the bar being split at one end of the main transverse section such that the main part of the bar is now L-shaped with the other wheel arm being free to rotate about the bar, but controlled by a cylinder. In this arrangement, the main bar includes a cylinder lever arm which actuates a double-acting cylinder which attached between the cylinder lever arm and the free wheel arm. Another alternative is to mount one of the body mounts of the bar inside a vertical slider having a single-acting cylinder either side of the bar mount, the two vertically opposed single-acting cylinders forming the two hydraulic chambers.

2) an anti-roll bar with adjustable stiffness through varying the distance between the main lateral axis of the anti-roll bar and the point at which the loads between the body and the wheel are input to the bar (ie vary wheel arm length by moving dropper along wheel arm using sliders driven by hydraulics or preferably by a lead screw driven by an electric motor. This electro-mechanical version can prevent the vehicle slowly leaning over with offset load). The wheel arm length of the bar may be adjusted (on both side simultaneously) in dependence on the loads on the springs. This version works best when air springs are used at both ends of the vehicle, the wheel arm length being adjusted by sliding along the wheel arm, the point at which the anti-roll bar dropper joins the wheel arm. This can be done using a screw jack arrangement, the length of wheel arm required being calculated as a function of the pressure in at least one air spring (preferably as a function of the average of the front air springs and the average of the back air spring pressures).

3) two double-acting cylinders on an axle, one on the left and one on the right hand side. The first chamber of each cylinder being connected to the second chamber of the laterally adjacent cylinder by a first and second line. Each first and second line having a respective first and second accumulator. If the first and second chambers are of equal effective piston area, then there is no displacement of fluid into the accumulators in pure pitch or heave motions of the wheels, but in roll motions, one first and one second chamber displacement goes into one accumulator and one first and one second chamber displacement is drawn from the other accumulator, this giving roll stiffness with no bounce stiffness like an anti-roll bar. As the pressure in the first and second lines is controlled with load, the roll stiffness for the associated axle is controlled. This arrangement may be provided for one axle only, but is preferably applied to all axles of the vehicle.

4) one adaptation of number 3) is to use unequal effective piston areas between the first and second chambers—ie have a rod extending from the piston through only the second chamber. Then the ratio of bounce to roll stiffness provided by the cylinders is dependent on a function of the rod and the bore diameters chosen for the cylinders. These cylinders can even then be used to provide load levelling by changing their fluid volume and pressure, thereby changing the associated roll stiffness with load. The cylinders can be used in series or preferably in parallel with other support springs, such as leaf springs, coil springs or air springs. Alternatively, they can be used to provide all the bounce support between the axle and the vehicle body. It is not necessary to sense the pressure of any part of the system when using these arrangements as the pressure and stiffness of the cylinders is dictated by the pressure required to level for the load applied, and therefore the cylinders can be designed to provide the required axle roll stiffness with load.

As there are comfort and handling improvements over conventional suspensions for passive roll control systems which are interconnected from front to rear, the same principle of changing roll stiffness and roll moment distribution with load and load position can be applied to these types of system. For example, there is disclosed in International Application PCT/AU00/00312, WO 00/61394 a suspension system including four hydraulic cylinders in place of the normal vehicle dampers (commonly referred to as "shock absorbers"). Each hydraulic cylinder is double-acting and may include a major and a minor chamber and damping valves on the two cylinder ports to provide compression and rebound damping. The major chambers of the cylinders on a first side of the vehicle are connected to each other and to the minor chambers of each cylinder on a second side of the vehicle forming a first fluid circuit. Similarly, the major chambers of the cylinders on the second side of the vehicle are connected to each other and to the minor chambers of each cylinder on the first side of the vehicle forming a second fluid circuit. Each fluid circuit preferably includes at least one hydro-pneumatic accumulator, which is primarily used to control the resilience of the system in the roll mode and absorb the rod displacements due to bounce motions. This system can be used to provide roll stiffness in addition to damping. It also allows for additional roll damping to be implemented by damping the accumulators in addition to the cylinder damper valves. By regulating the operating pressure of the system as a function of the load on the vehicle, the roll stiffness can be changed. However, depending on the roll stiffness and roll moment distribution of the support means of the vehicle, the overall vehicle roll moment distribution can change in the opposite direction to that required. For example, if a truck has a large payload capability, it can have very stiff rear springs, so if the roll moment distribution is correct when the truck is fully laden, then when load is removed and the pressure in the roll control system correspondingly reduced, the front roll stiffness will drop a larger percentage than the rear roll stiffness, so the overall roll moment distribution will end up excessively rear biased, driven by the stiff rear support springs. As the payload in the truck is reduced, the required roll moment distribution actually moves in the opposite direction, ie forwards. One solution to this is to use softer rear springs with independent helper hydraulic cylinders to provide load levelling and additional spring rate with load. The helper cylinder may be a single acting cylinder with at least one associated accumulator, and may be used in series with a leaf, coil or other type of conventional spring. When the vehicle is unladen, the conventional spring may take about 70% of the light load and the helper cylinder runs at low pressure. When the vehicle is fully laden, the helper cylinder may be used to level the vehicle back to a common ride height, then the conventional spring is still taking the same load as in the unladen state, the helper hydraulic cylinder is supporting the remainder of the load and running at a higher pressure. The variation in pressure in the helper hydraulic cylinder causes a change in the volume of gas in the accumulator and therefore a change in the spring rate of the cylinder, making it stiffer as it supports more load. The helper hydraulic cylinders therefore provide not only an increasing bounce stiffness with load, but also an increasing rear roll stiffness with load. The roll control system does not then need to provide such a high rear roll stiffness contribution when the helper hydraulic cylinders are used in the laden state, and when the vehicle is unladen, the overall vehicle roll moment distribution can move forwards to maintain stability and the roll stiffness be decreased to maintain comfort.

The pressure of fluid in the helper hydraulic cylinders may be used to help determine the pressure to which the roll system should be regulated, or it is even possible to directly feed the helper cylinder pressure to the roll control system, but in some cases, this can lead to difficulties sizing components and getting the required stiffness ranges. The pressure regulation of the roll system in dependence on the pressure of the helper cylinder may be accomplished electronically, or passively. If a passive method is chosen, it may be necessary to utilise a further passive or electronic adjustment blocking valve to prevent erroneous adjustments being made during cornering of the vehicle. If the main regulation is electronic, the inclusion of at least a lateral accelerometer or lateral acceleration signal can negate the need for the further blocking valve.

The rear helper hydraulic cylinders may in fact be used to totally replace the other conventional support means and provide all the support for the rear of the vehicle.

If a rear helper cylinder is used with a double-acting roll control cylinder, both cylinders may be replaced with one triple-acting cylinder.

A further optimisation of the roll stiffness can be done by assuming the measured load is at a maximum height initially for safety, then measuring the roll angle with lateral acceleration, comparing it to a predicted roll angle for that lateral acceleration and determining the actual height of the centre of mass of the vehicle. Then a true balance can be chosen to maximise the combination of comfort and stability of the vehicle. Basically the roll stiffness required depends on the magnitude and height of the centre mass of the vehicle. The roll moment distribution required depends on the fore/aft position of the centre of mass. It is not possible to measure the height of the centre of mass, but it can be found by comparing the roll angle for a given load with a predicted angle for an assumed centre of mass. If the centre of mass is initially assumed to be high up, then the roll stiffness will always be adequate, but probably too high—a safe way to be, but uncomfortable. Then to improve comfort, the comparison between predicted roll angle and actual roll angle can be used to hone in on the correct stiffness for the centre of mass height of the vehicle, by reducing the roll stiffness until predicted and actual measured roll angle are the same.

The accompanying drawings illustrate preferred embodiments of the present invention. Other embodiments are possible, and consequently the particularity of the accompanying drawings is not to be understood as superseding the generality of the preceding description of the invention. In the drawings.

Figure 1:
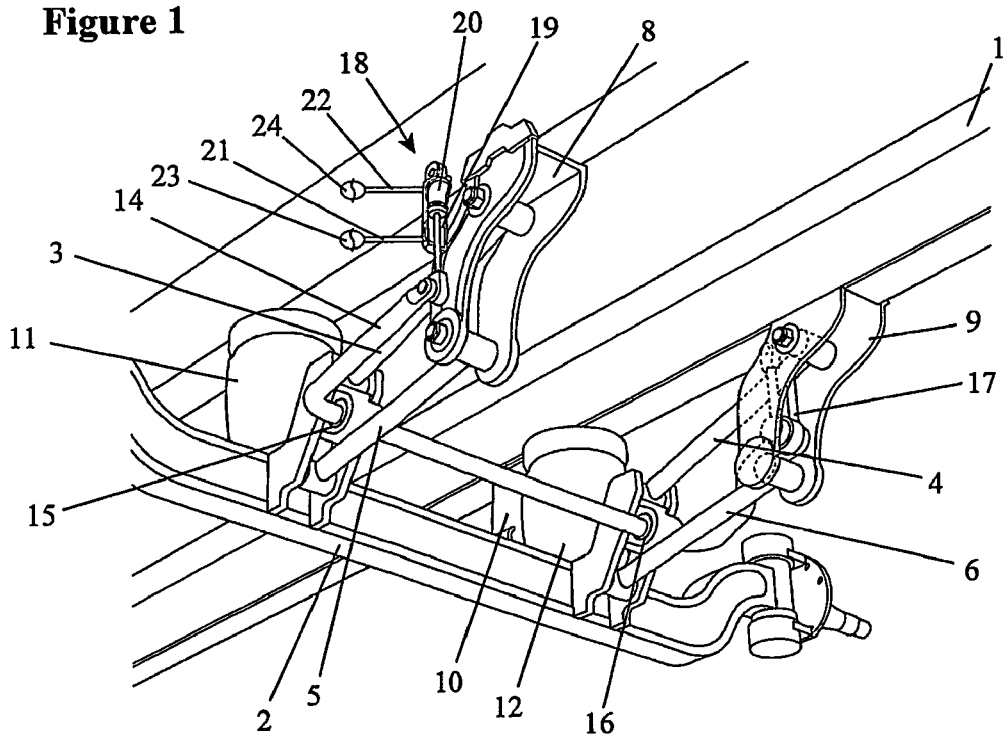
FIG. 1 is a perspective view of a first possible arrangement of a roll moment reaction means of a vehicle suspension system according to the present invention.

Referring initially to FIG. 1, a vehicle frame (1) and axle (2) is shown. The axle is located to the frame using a conventional five-link geometry arrangement comprising two upper trailing arms (3, 4), two lower trailing arms (5, 6) and a Panhard rod (not shown). The left hand side trailing arms (3, 5) and right hand side trailing arms (4, 6) and Panhard rod arm mounted to the frame via brackets 8, 9 and 10. The frame is supported above the axle by air springs (11, 12) which may be interconnected by a high flow pneumatic line to provide zero roll stiffness, or interconnected by a low flow (height levelling only) pneumatic line to provide some dynamic roll stiffness, or independently controlled to provide height and some roll levelling and roll stiffness.

An anti-roll bar (14) is located on the axle by bushings (15, 16) and connected to the frame via a conventional fixed length drop link (17) on one side and a variable length drop link in the form of a dropper cylinder (18) on the other side. The dropper cylinder is a double-acting ram having two fluid chambers (19, 20) connected via conduits 21, 22 to respective accumulators 23 and 24. If the pressure in the fluid chambers (19, 20) and the conduits (21, 22) is controlled to be low (but still sufficiently more than the pre-charge of the accumulator to allow enough diaphragm travel for full extension of the cylinder 18), then the effective roll stiffness of the anti-roll bar is low. Similarly, if the pressure in the fluid chambers (19, 20) and the conduits (21, 22) is controlled to be high, the effective roll stiffness of the anti-roll bar is high. By detecting the load (and optionally its position) on the vehicle (by measuring the air spring pressures) a desired roll stiffness for the axle assembly can be set by controlling the pressure in the fluid chambers (19, 20). It may be desirable to provide lock-out valves for the accumulators (23, 24) to provide the maximum roll stiffness from the anti-roll bar assembly in extreme load cases.

Figure 4:
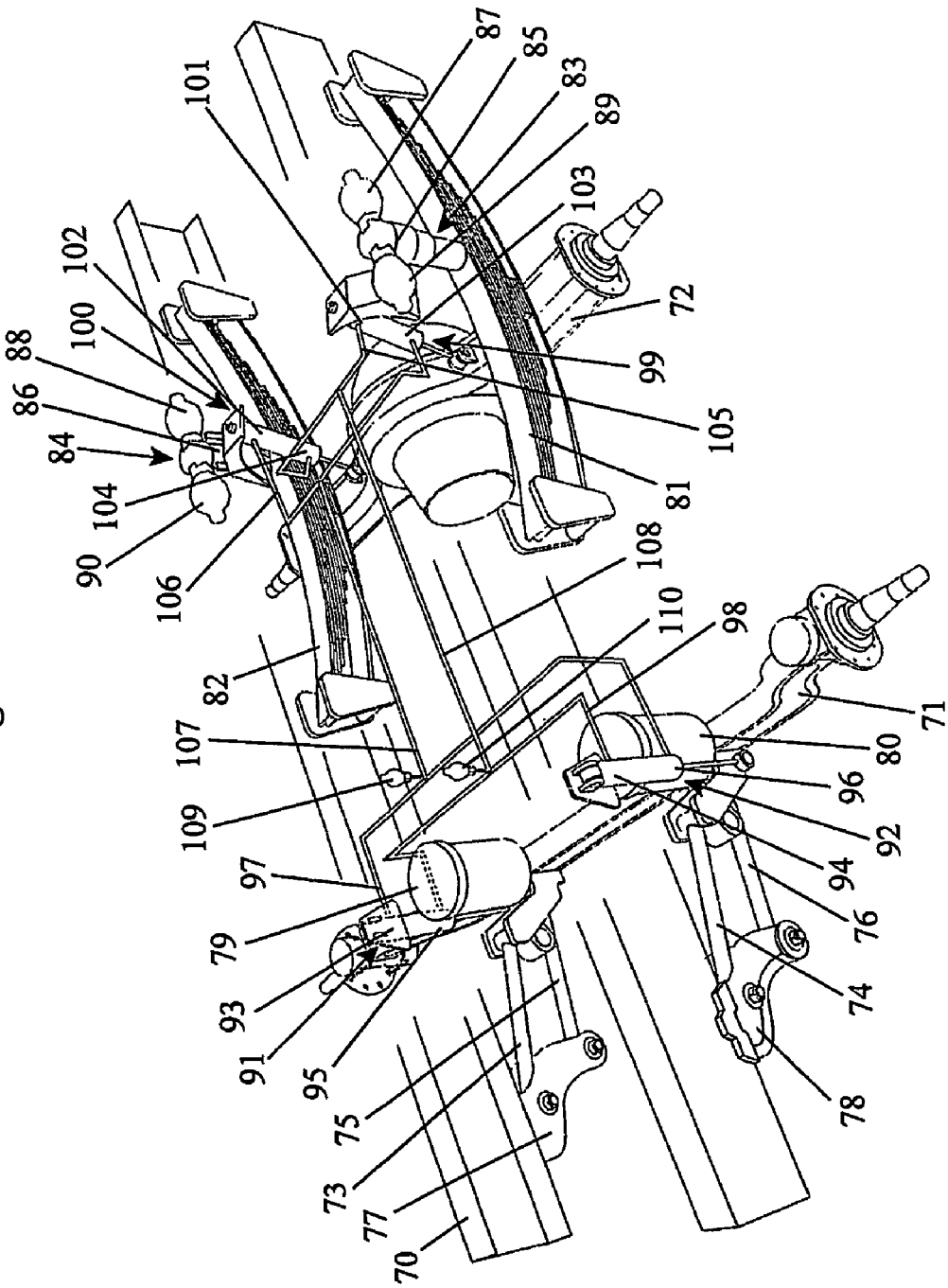
FIG. 4 is a perspective view of a fourth possible arrangement of a roll moment reaction means of a vehicle suspension system including rear helper hydraulic cylinders.
Figure 5:
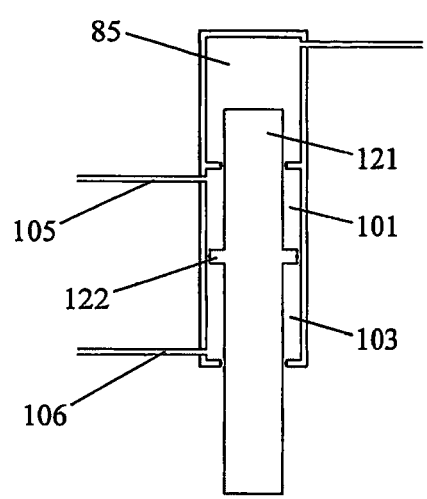
FIG. 5 is a schematic illustration of a first layout of three chambered cylinder.

It should be appreciated that there are many variations possible on the arrangement shown in FIG. 1 which can accomplish the same goal of providing a variable amount of roll stiffness from an anti-roll bar to enable control of the roll stiffness and roll moment distribution of a vehicle, in dependence on the load on the vehicle. For example, additional accumulators could be provided on the conduits 21 and 22 via lock-out valves so that the roll stiffness can be switched between a stiff cornering mode (where only accumulators 23 and 24 are in communication with the double-acting ram) and a straight line comfort mode (where the additional accumulators are also in communication with the double-acting ram). Alternatively or additionally, further accumulators may be provided on the conduits 21 and 22 via lock-out valves to enable the roll stiffness to be varied over a wider range. A further option is to provide an interconnection valve between the two conduits 21 and 22 to enable chambers 19 and 20 and the accumulators to be interconnected when the vehicle is travelling in a straight line to further improve comfort and to enable the interconnection valve to be locked out to provide high roll stiffness during cornering. The control algorithms for this type of valve are well known, using inputs such steering rate, lateral g, vehicle speed and steering angle. Also the physical arrangement of the anti-roll bar and adjusting cylinder can be varied in a multitude of ways. The double acting ram may be repositioned in a lever arm arrangement as part of the U-shape of the anti-roll bar (as shown in FIGS. 4 and 5 of the applicant's U.S. Pat. No. 6,217,047) and a second conventional fixed length drop link used to connect the anti-roll bar to the frame. Similarly the anti-roll bar may be split along its lateral axis and the double-acting ram located between the two halves to control their relative position (as shown in FIG. 13 of the applicant's U.S. Pat. No. 6,217,047). The lateral axis of the bar may be mounted to the frame by one fixed and one variable length drop link with the ends of the bar fixed to the axle via bushings (as shown in FIG. 2 of the applicant's International Patent Application PCT/AU00/01071).

Figure 2:
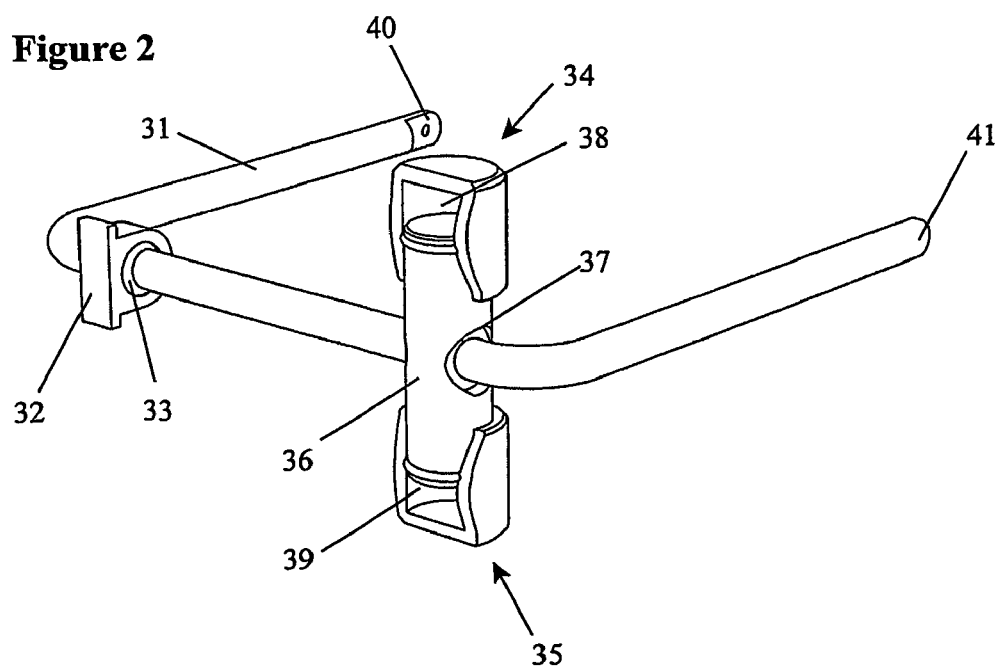
FIG. 2 is a perspective view of a second possible arrangement of a roll moment reaction means of a vehicle suspension system according to the present invention.

A further possible adjustable anti-roll bar arrangement is shown in FIG. 2. The anti-roll bar 31 is mounted to the frame (not shown) by a frame mount 32. The frame mount 32 is attached to the bar by a bushing or ball joint 33. The bar is also located to the frame by an in-line pair of single-acting cylinders 34 and 35 which are fixed to the frame. A piston rod 36 runs inside the cylinders (34, 35) to effectively form a double-acting ram having the chambers 38 and 39. The piston rod is attached to the bar (31) by a bushing or preferably a ball joint 37 (to reduce cylinder side load and therefore friction). The extremities of the bar (40, 41) are attached to the axle using either bushings or drop links.

As described with respect to FIG. 1, the two cylinder chambers (38, 39) may have their pressures controlled in dependence on a function of the air spring pressures (or any other measure of vehicle load) to give variable roll stiffness. If the chambers are filled with hydraulic fluid, additional conduits and accumulators are necessary as in FIG. 1 (reference numerals 21-24) and additional valves and/or accumulators may be provided.

Figure 3:
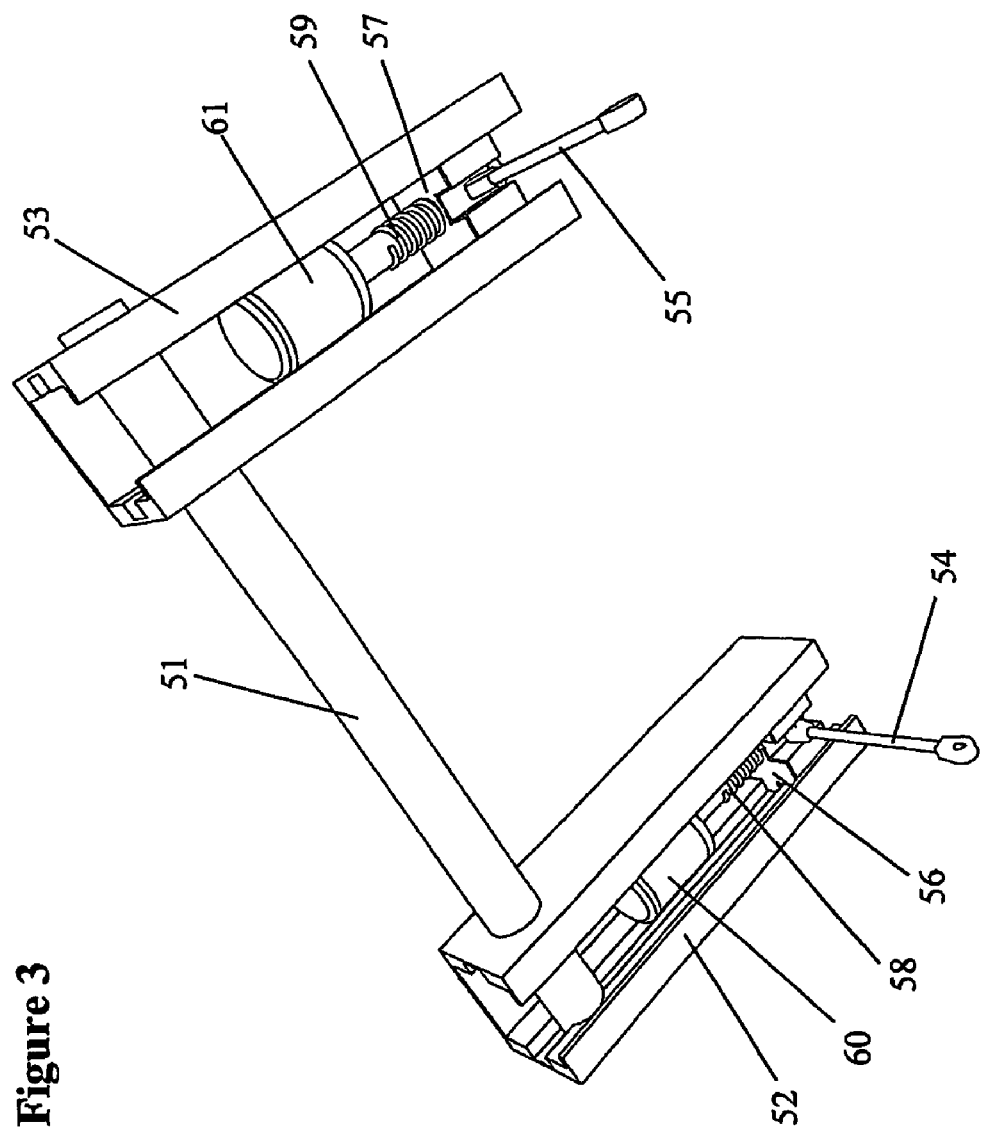
FIG. 3 is a perspective view of a third possible arrangement of a roll moment reaction means of a vehicle suspension system according to the present invention.

A yet further possible adjustable anti-roll bar arrangement is shown in FIG. 3. Here the roll stiffness of the anti-roll bar (51) is made adjustable by changing the effective length of the anti-roll bar lever arms 52 and 53. This is accomplished by controlling the length along the lever arms (52, 53) at which the drop links 54 and 55 are attached. The lower ends of the drop links (54, 55) are typically connected to the axle by bushings or rod-end type spherical joints. The upper ends of the drop links are connected (using similar joints) to slider blocks 56 and 57 which are designed to slide along the anti-roll bar lever arms (52, 53). The position of each slider block is controlled by a lead screw (58, 59) driven by an electric motor (60, 61), the position being sensed in any number of ways, such as by linear displacement transducers or multi-turn rotary position sensors.

The anti-roll bar arrangement is shown in the minimum roll stiffness position, ie with the slider blocks at their maximum position from the lateral portion of the anti-roll bar. This puts the largest moment on the lateral portion of the anti-roll bar for any given drop link vertical force, producing the largest deflection and therefore the lowest stiffness. Conversely, if the electric motors power the lead screws to draw the slide blocks up to the other end of their travel, near the lateral portion of the anti roll bar, this puts the smallest moment on the lateral portion of the anti-roll bar for any given drop link vertical force, producing the smallest deflection and therefore the highest stiffness. Consequently, for any detected load on one or more axles, the roll stiffness of an axle can be controlled.

Ideally, the position of each slider block is controlled so that the effective lever arm length is the same on both sides, otherwise the anti-roll bar can generate roll loads in a pure bounce motion and try to roll the vehicle as it bounces.

This arrangement is usually designed so that the drop links are more upright when the anti-roll bar is stiff (ie when the effective anti-roll bar lever arms are short) than when the anti-roll bar is soft (ie the effective lever arms are longer). It is usually desirable to keep the drop links upright when there is a high roll stiffness and the force in the drop links is greatest, so that the longitudinal force input to the axle by the drop link is small. Inputting large longitudinal forces into the axle from the drop links due to roll forces can cause deflection of the bushes locating the axle in the longitudinal direction, giving roll steer. It may however be desirable to design the geometry of the anti-roll bar (including its position behind or in-front of the axle) to give roll steer effects to increase vehicle stability. Generally on a high centre of mass fully laden truck, this is a very negligible effect.

One well-known alternative way of changing the roll stiffness of an anti-roll bar assembly, which may be employed to accomplish the aims of the present invention, is to use a similar lateral torsional member, but use a thin beam in place of at least one of the lever arms. The beams have a low bending stiffness when they are angled such that they are flat (short length of section is vertical and long length of section is in a lateral direction) and they have a high bending stiffness when they are upright (long length of section is vertical and short length of section is in a lateral direction). By controlling the rotation of the beams, the roll stiffness of the bar can be controlled. To gain the widest range of adjust, with the most precision, the best arrangement is to use a thin beam in place of each anti-roll bar lever arm (giving the range of adjustability) and controlling the rotation of one beam from flat to upright to increase roll stiffness initially, until it is upright, then controlling the rotation of the other thin beam from flat to upright (reducing the need for precise control of the rotation of each that would be needed if both were adjusted together).

FIG. 4 is a broken view of the front and rear suspensions of a truck, with the centre section of the wheelbase removed to condense the view. The front axle 71 is located to the frame 70 by a five link arrangement, having four trailing arms (73, 74, 75, 76) and a Panhard rod (omitted for clarity). The frame is supported on the front axle by air springs (79, 80) and on the rear axle 72 by leaf springs (81, 82) which also provide rear axle location. In this arrangement, the leaf springs are only designed to take a portion of the vehicle load on the rear axle when the vehicle is unladen, additional support and load levelling being provided by hydraulic helper cylinders 83 and 84. The helper cylinders are single acting rams, having a single pressure chamber each (85, 86) which is filled with hydraulic fluid and in communication with at least one pressure accumulator (87, 88). Due to the large range of operating pressures that the helper cylinders need to cover to provide load levelling from the unladen to the fully laden condition, it can be desirable to provide additional accumulators (shown at 89 and 90), which may be switched in and out of communication if desired, based on load. The purpose of the helper cylinders (in addition to providing load levelling) is to provide individual left and right rear stiffness rates which increase with load, which therefore increases the roll stiffness and moves the roll moment distribution of the suspension rearwards with increasing rear axle load. The load levelling of the helper cylinders may be passive, using spool valves actuated by a linkage between the frame and the axle to control the supply and return of pressurised fluid to a fluid pressure supply system (not shown). In this case the tuning of the change in roll moment distribution with rear axle load is in the original part design and sizing and is, in operation, passive.

Also shown in FIG. 4 is a fluid roll moment reacting system, provided by four double-acting roll control cylinders (91, 92, 99, 100). These cylinders are shown connected in a manner similar to that shown in FIG. 8 of the applicant's International Application Number PCT/AU00/00312. The compression chamber 93 of the front right roll control cylinder 91 is connected to the rebound chamber 96 of the front left roll control cylinder 92 by a lateral fluid conduit 97. The compression chamber 94 of the front left roll control cylinder 92 is similarly connected to the rebound chamber 95 of the front right roll control cylinder 91 by a lateral fluid conduit 98. One accumulator (109, 110) is shown on each lateral fluid conduit (97, 98) although more may be used, such as one near the compression chamber of each cylinder. The connection of the lateral fluid lines as described provides for a decoupling of the bounce and roll stiffness for the cylinders (91, 92). In bounce, the rod volume of each cylinder in displaced into the accumulator. In roll the bore volume of one cylinder and the annular volume of the other cylinder are displaced into one accumulator and out of the other. This provides a high roll stiffness, and if the rod diameters are small, a low (in this case negligible) bounce stiffness.

Similarly, at the rear, the compression chamber 101 of the back left roll control cylinder 99 is connected to the rebound chamber 104 of the back right roll control cylinder 100 by a lateral fluid conduit 105, and the compression chamber 102 of the back right roll control cylinder 100 is connected to the rebound chamber 103 of the back left roll control cylinder 99 by a lateral fluid conduit 106. The front and rear roll moment reacting system lateral fluid conduits are connected by longitudinal fluid conduits 107 and 108 such that the roll moment reacting system provides roll stiffness without providing an associated warp stiffness (the front to rear connections allow the system to passively differentiate between roll and warp motions of the axles with respect to the frame which provides significant ride benefits through the reduction of single wheel input stiffness).

Although accumulators (109, 110) are only shown on the front lateral fluid conduits (97, 98), they could alternatively or additionally be positioned anywhere along the longitudinal fluid conduits (107, 108) or on the rear lateral fluid conduits (105, 106).

Figure 6:
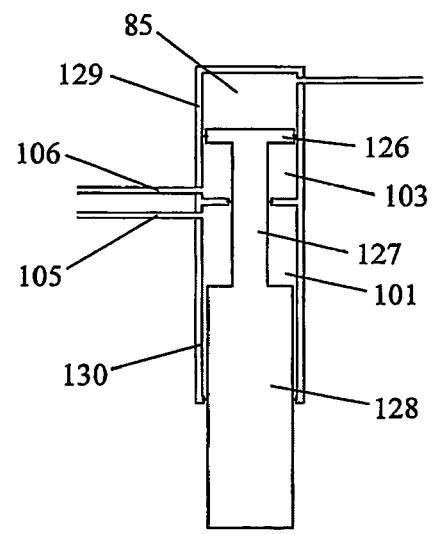
FIG. 6 is a schematic illustration of a second layout of three chambered cylinder.
Figure 7:
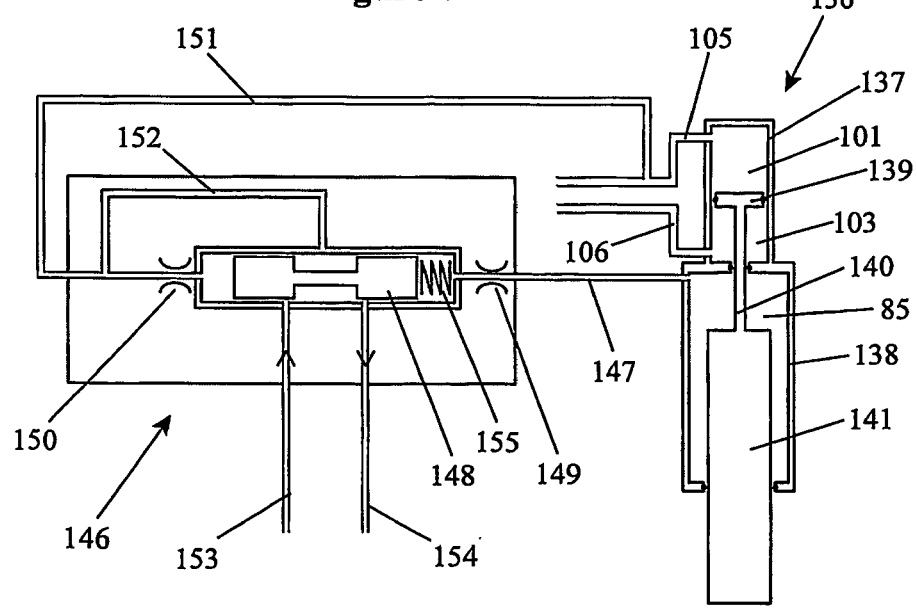
FIG. 7 is a schematic illustration of a third layout of three chambered cylinder with a pressure proportioning valve shown.

FIGS. 5, 6 and 7 show an alternative combined arrangements of the rear helper cylinder and roll moment reacting cylinder. In each figure, the two cylinders at a rear wheel have been combined into a single unit to simplify the number of parts in the system and aid packaging. The same reference numerals as FIG. 4 have been retained for the chambers to assist in identifying the equivalent chambers in these figures. The roll moment reaction system lateral conduits 105 and 106 are also shown.

In FIG. 5, a large diameter rod (121) displaces into the "helper cylinder" chamber 85, which is again connected to one or more pressure accumulators (not shown). The roll moment reacting cylinder chambers are formed by the piston 122 on rod 121. In this case, the roll moment reacting chambers have the same effective area for compression (101) and rebound (103), which would remove any bounce stiffness from the roll moment reacting portion of the cylinder. It is possible to use a different diameter rod beneath the piston (122) to provide a larger effective rebound area which can be preferable to provide more rebound damping force and vehicle height pull down on lateral acceleration (for increased stability).

Alternatively, or additionally, it may be preferable to swap the chambers labelled 85 and 101 such that 85 becomes the roll moment reaction compression chamber (which can be a small effective area chamber) and 101 becomes the helper cylinder chamber. In this case a smaller rod and lager piston may be used to gain the required balance between the effective areas of the different chambers.

In FIG. 6, the full bore diameter of the upper portion of the cylinder (129) is used along with a piston (126) to form the "helper cylinder" chamber 85 which displaces into one or more accumulators (again not shown). The annular chamber (103) under the piston 126 is formed between the cylinder 129 and the rod 127, and is the rebound chamber for the roll moment reaction system. In the lower portion of the cylinder 130, the rod 127 steps out to full bore diameter at rod 128, the annular area above rod 128 forming the compression chamber 101 of the roll moment reaction system. As the compression chamber (101) of the roll moment reaction system can have the smallest area of all three chambers in the cylinder, the lower portion of the cylinder (130) can be a smaller diameter than the upper portion of the cylinder (129).

In FIG. 7, the roll moment reaction cylinder is on top of the "helper cylinder", both again being combined into one triple-acting ram (136). The upper, roll moment reaction cylinder portion (137) of the triple-acting ram (136) is divided by a piston (139) into a compression chamber (101) and a rebound chamber (103). The piston (139) is attached to a small diameter rod (140), which passes into the helper cylinder chamber (85). The lower end of the small diameter rod is attached to a large diameter rod (141) which, together with the lower, "helper cylinder" bore (138) defines the annular "helper cylinder" chamber (85). The bore (138) is shown larger than the roll moment reaction cylinder (137), this construction being preferable, although it may be same size or smaller, as determined by the design criteria of the particular vehicle.

The roll moment distribution of the roll moment reacting system is fixed through part sizing and position. However, the pressures in the roll moment reaction system can be controlled to give a varying roll stiffness with load. A spool valve arrangement (146) to accomplish this passively in dependence on the load is also shown in FIG. 7. One of these arrangements may be provided for each side of the rear axle of the vehicle to set left and right roll moment reaction system pressures. Alternatively, a bleed may be provided between the two fluid volumes of the roll moment reaction system (say between conduits 107 and 108) to equalise the system pressures and only one spool valve used to set these equalising pressures.

A conduit (147) feeds pressure from the helper cylinder to one end of the spool valve (148), the pressure feed being damped by an optional restrictor (149). The other end of the spool valve is connected (again through an optional restrictor 150) to the compression chamber (101) of the roll moment reacting cylinder (137) by a conduit 151. The pressure balance between the helper cylinder chamber (85) and the roll moment reaction cylinder compression chamber (101) determines whether the spool valve needs to let fluid into, or release fluid from the roll moment reaction system, through conduit 152. Fluid pressure supply conduit 153 and return conduit 154 are shown which are connected to a fluid pressure supply system (not shown). A spring may be provided at either end of the spool valve (shown at 155) to enable an offset to be put into the pressure balance. The relationship between the pressures in chambers 85 and 101 can also be set by the design of the ends of the spool valve. Additionally, an optional valve (not shown) may be provided on conduit 151 or 152, the valve being open in straight-line running and closed during cornering, to prevent unwanted pressure control actions due to temporary pressure offsets caused by lateral g-forces.

Figure 8:
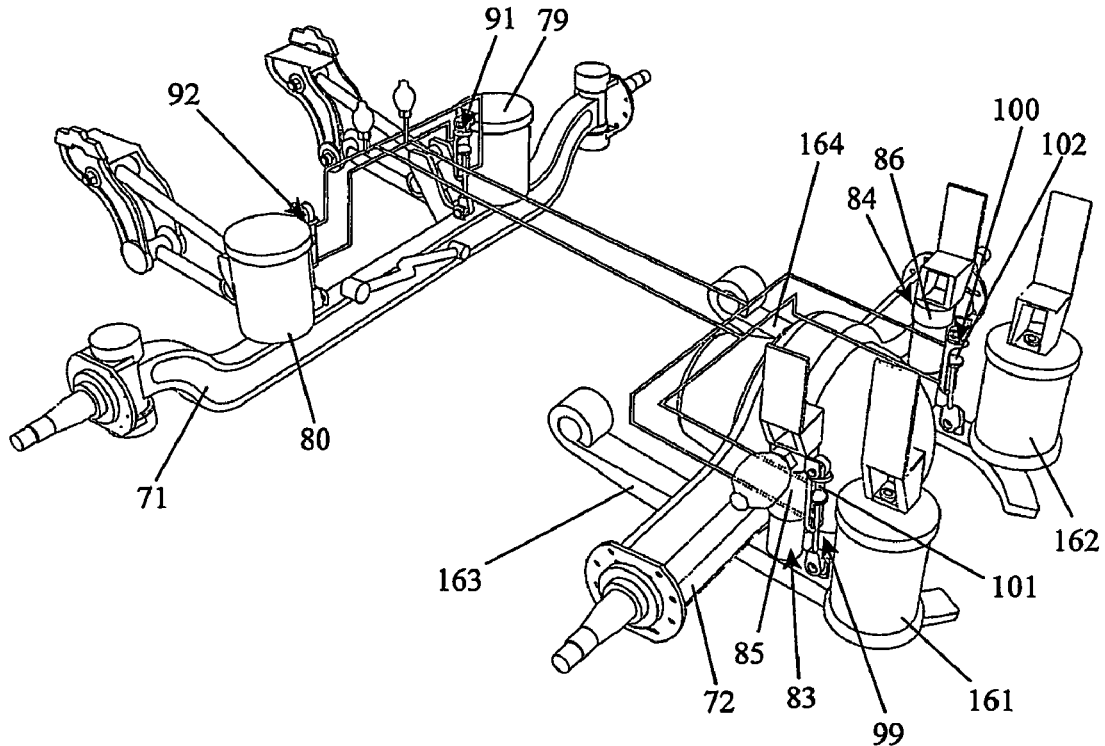
FIG. 8 is a schematic illustration of a four-wheel-interconnected fluid suspension.

FIG. 8 shows a similar variable roll stiffness and roll moment distribution system to that in FIG. 4. Like items have been assigned the same reference numerals as those used in FIG. 4. The rear (partial support) leaf springs have been replaced with air springs 161 and 162 acting on trailing arm type beams 163 and 164 which locate the axle. The rear of the vehicle is now supported in part by the air springs (161, 162) and in part by the helper cylinders (83, 84). As the air springs can provide a variable force for any displacement, depending on the pressure they are controlled to, in the unladen condition, they can be controlled to a low pressure, giving the helper cylinder a larger proportion of the load than is possible using fixed stiffness leaf springs. This reduces the ratio of operating pressure required for the helper cylinder from unladen to laden, giving more options in initial part sizing design. Ideally the pressure in the helper cylinder is proportional to the pressure in the air spring across the load range (with an offset in the graph of "air spring vs helper cylinder pressure" being useful for some vehicles). If the front air springs (79, 80) are connected by a small diameter line to allow air flow for height levelling (without removing all of the dynamic roll stiffness of the air springs) and the rear air springs (161, 162) are individually controlled to provide height and roll levelling, then the pressures in the left and right rear helper cylinders (83, 84) can be set using a valve as shown in FIG. 9 or using pressure sensors and solenoid valves (or the air spring supply, the helper cylinder supply and even optionally the roll moment reaction system pressures may all be determined by an electronic control unit using pressure and displacement sensors).

Figure 9:
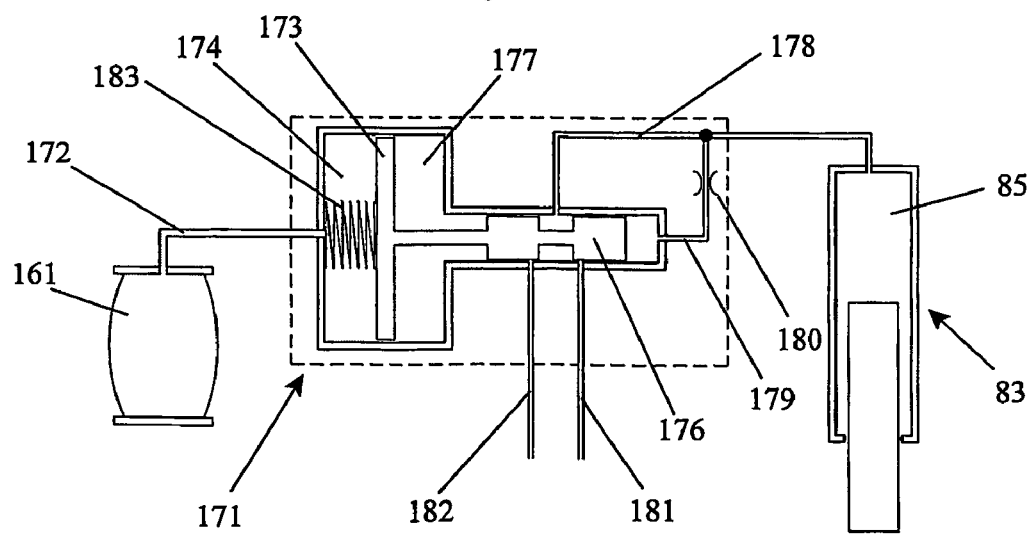
FIG. 9 is a schematic of a pressure proportioning valve for the system shown in FIG. 8.

FIG. 9 shows a possible valve (171) to accomplish the setting of the relationship between air spring (161) and helper cylinder (83) pressure. As the air spring is controlled to achieve the correct height at the associated corner of the vehicle, its pressure varies. For example, if load is added to the vehicle, initially the height drops. Then the levelling control acting on the air spring supplies more pressure to the air spring. As the pressure in the air spring increases, this increased pressure is fed into the valve 171 by conduit 172. Ideally conduit 172 is small in diameter to prevent major swings in dynamic pressure in the air spring reaching the valve. Otherwise a restrictor (not shown) may need to be provided on the conduit. The air spring pressure acts on a large diameter piston (173), filling the end chamber 174 of the valve with air at the same (time-averaged) pressure as the air spring. A rod 175 connects the piston (173) to the sliding body (176) of the spool valve, passing through chamber 177 which is vented to atmosphere. Pressure from the pressure chamber (85) of the helper cylinder (83) is fed to the other end of the sliding body (176) of the spool valve via conduits 178 and 179. As with conduit 172, conduit 179 may be small diameter to damp pressure swings, or it may incorporate a restriction as shown at 180. As the pressure balance between the air spring and the helper cylinder varies, the spool valve sliding body 176 shuttles to connect the helper cylinder conduit 178 with either a fluid supply conduit 181 (attached to a source of pressurised fluid—not shown) or a fluid return conduit 182 (attached to a tank—not shown). A spring may be provided at either end of the spool valve sliding body (176) to provide an offset in the ratio between the air spring pressure and the helper cylinder pressure. In FIG. 9 this spring is shown at 183 to provide more pressure in the helper cylinder than the air spring than the area ratio on the spool valve would set in order to reduce the pressure swing from unladen to laden in the helper cylinder. This reduces the change in natural frequency with load change.

The pressures in the roll moment reaction system cylinders (91, 92, 99, 100 in FIG. 8) can be set to be the same as the helper cylinder pressures by connecting chambers 85 and 101 through a bleed and connecting chambers 86 and 102 through a bleed to slowly equalise the pressures. This is a simple way to change the roll stiffness of the roll moment reaction system. Alternatively, a valve as shown in FIG. 7, or any electronic control may be used.

Figure 10:
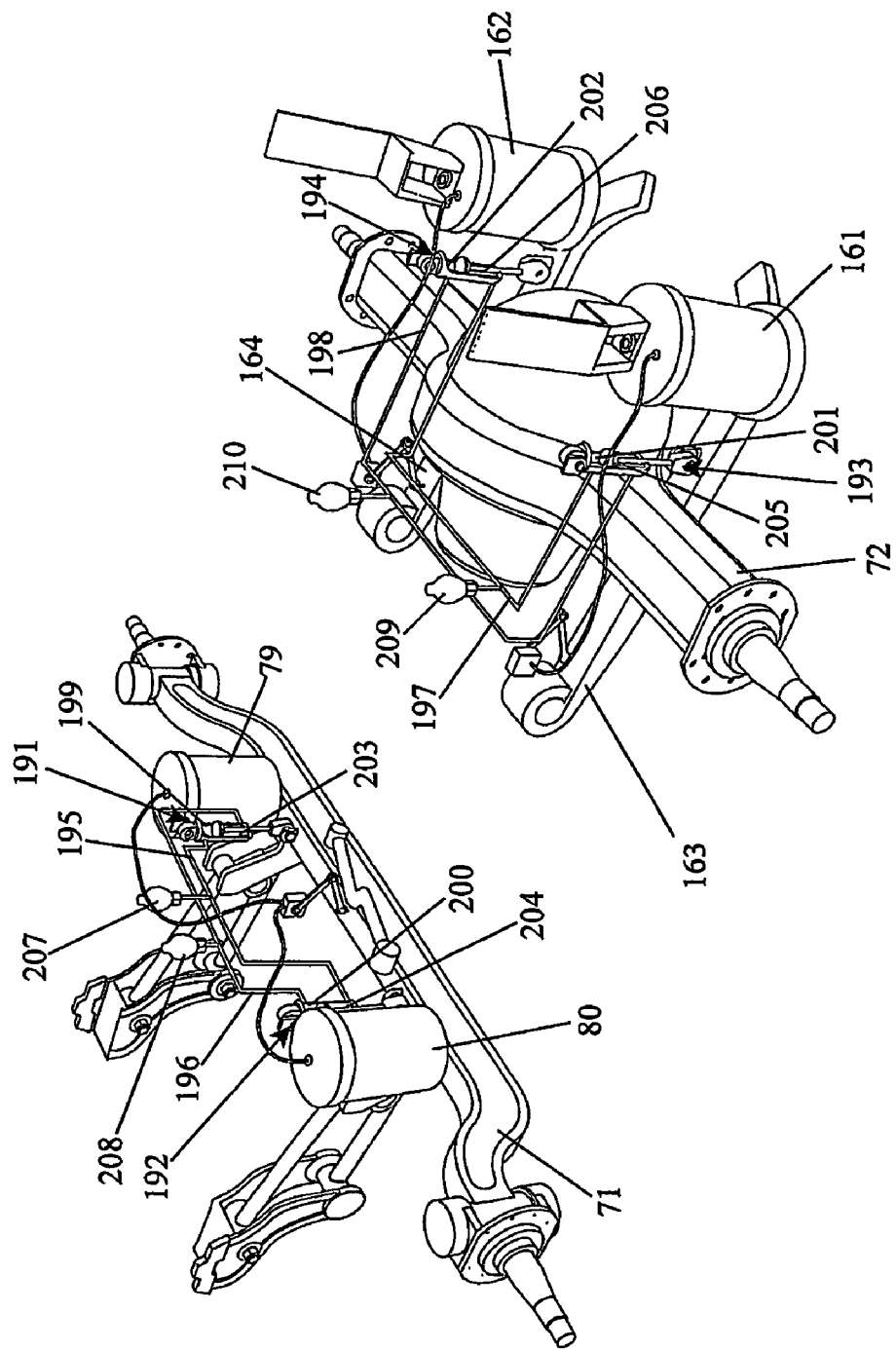
FIG. 10 is a schematic of an alternative arrangement of components for the present invention.

FIG. 10 shows a suspension system utilising air springs (79, 80, 161, 162) for support and double-acting hydraulic cylinders (191, 192, 193, 194) for the roll moment reacting system. The cylinders on each axle are cross-connected by high flow hydraulic lateral conduits (195, 196, 197, 198), but in this case (as opposed to FIGS. 4 and 8) the cylinders of the front axle (71) are not connected to the cylinders of the rear axle (72). Conduit 195 connects the compression chamber 199 of the front right cylinder 191 to the rebound chamber 204 of the front left cylinder 192 and conduit 196 connects the compression chamber 200 of the front left cylinder 192 to the rebound chamber 203 of the front right cylinder 191. Similarly, conduit 197 connects the compression chamber 201 of the back left cylinder 193 to the rebound chamber 206 of the back right cylinder 194 and conduit 199 connects the compression chamber 202 of the back right cylinder 194 to the rebound chamber 205 of the back left cylinder 193. At least one accumulator (207, 208, 209, 210) is connected to each of the lateral conduits (195, 196, 197, 198). This laterally cross-connected double-acting cylinder arrangement of roll moment reaction system gives different stiffness rates for bounce and roll, the difference being greatest when the cylinder rods are of small diameter, giving a low or negligible bounce stiffness. As with the roll moment reaction system shown in FIGS. 4 and 8, damper valves (not shown) may be placed between the accumulators and the lateral conduits to provide a similar ratio of roll to bounce damping as the ratio of roll to bounce stiffness. This allows for a better than conventional balance between high roll damping and good comfort. The damper valves may be variable, switchable, or incorporate a switchable bypass to reduce roll damping when travelling in a straight line to further improve comfort.

The roll stiffness of the roll moment reacting system on each axle can be (independently) varied to adjust the roll stiffness and roll moment distribution of the roll moment reacting system in dependence, for example on vehicle load and load position. This can be done in a number of ways, with a few different performance characteristics available. All of the examples below will assume that the front air springs are leveled using a conventional single-point levelling arrangement (ie a position sensor in the centre of the axle can be used to control air flow into or out of a small diameter conduit interconnecting the front air springs for levelling purposes, but not large enough for significant dynamic air flow between the air springs). The front and rear may be swapped in the following examples as will be obvious to one skilled in the art.

For example, the pressure in both front conduits (195, 196) may be set to be common, and determined by the pressure in the small diameter conduit interconnecting the front air springs. The rear air springs may be similarly controlled using single-point levelling and the pressure in both rear conduits (197, 198) set to be common, determined by the pressure in the small diameter conduit interconnecting the rear air springs. In this case, any lateral offset of the load from the vehicle centre-line must by reacted by inherent (auxiliary) roll stiffness in the geometry locating the front and/or rear axles (ie the trailing arm type beams 163 and 164). There is no roll load offset reacted by the air springs or the roll moment reaction system. Alternatively the rear air springs may be independently controlled to provide rear height levelling and vehicle roll attitude levelling, and the pressure in both rear conduits (197, 198) may be set to be common, determined by, for example, the average pressure in the rear air springs. In this case, again the roll moment reacting system does not take any of the roll load offset, the offset being reacted by the air springs (and, if there is a pressure limit for the air springs, an extreme offset load may then also be partially reacted by any inherent (auxiliary) roll stiffness in the geometry locating the front and/or rear axles).

A further alternative, if the rear air springs are independently controlled, is to set the pressures in the two rear roll moment reacting system conduits independently to react some or all of the offset roll load. If the roll moment reacting system conduit pressures are set such that there is a ratio between the conduit pressures and the air spring pressures, then the air springs will still react some of the offset load and a valve similar to that shown in FIG. 9 can be used to accomplish this. To do this, the conduit 178 is connected to the major chamber of the roll moment reacting system cylinder at the same corner of the vehicle. It is also possible to use the air springs at one end of the vehicle to react some of the offset load and the roll moment reacting cylinders at the opposite end of the vehicle to react the remainder of the offset load. If all of the roll load offset is to be reacted by the roll moment reacting cylinders at one end of the vehicle, it is necessary to determine the pressure in the two lateral conduits between those cylinders in addition to the air spring pressures in order to calculate the lateral position of the offset load and determine the correct lateral conduit pressures to react the offset load completely.

Finally, if the front air springs use single-point levelling and the rear air springs are independently controlled using two-point levelling, the three air pressures (in the front air springs, the rear left air spring(s) and the rear right air spring(s)) can be used to calculate the magnitude, fore-aft position and lateral position of the load on the vehicle. This can be used to determine (and set) the individual, optimum pressure for each of the conduits (195, 196, 197, 198) of the roll moment reacting system. If there is already pressure in the roll moment reacting system, the pressure in each of the conduits (195, 196, 197, 198) is also required in order to calculate the lateral position of the load on the vehicle. The offset roll loads can be either shared between the roll moment reacting system and the rear air springs, or taken entirely by the roll moment reacting system, depending on the algorithm used and the specific vehicle requirements, In sharing the offset roll loads within the roll moment reacting system between the front and rear cylinder pairs, the difference in roll loads front to rear is reduced, reducing what could otherwise be high rear single wheel stiffness. The methods detailed in the four alternative roll moment reaction system pressure setting options above can also be applied to the roll moment reacting system arrangements shown in FIGS. 1 and 2.

It is worth noting that when controlling or setting the roll moment reaction system pressures is mentioned, these pressures are the static operating pressures, not any dynamic or steady-state cornering pressures. The static operating pressure can be determined whilst the vehicle is in operation by damping the point at which the pressure is taken, or averaging the pressure over a time period. It may be necessary to use a method of preventing either pressures being taken, or unnecessary or undesirable "corrections" being made to the operating pressures in the system whilst the vehicle is cornering.

As will be readily appreciated from many of the applicant's other patents and patent applications, it is a very straightforward matter to adapt the present invention to a vehicle with more than simply one front and one rear axle. For example, the roll control system can act on a walking beam tandem axle arrangement on say the rear of a truck (in the case of the anti-roll bar arrangement, using a construction as shown in the applicant's International Application Number PCT/AU01/00591). The system can be easily extended to cover an additional axle by duplicating the components described above. If a roll control arrangement with a front to rear connection is provided (as in FIG. 4) similar cylinders can be added for each axle, the individual chambers of each cylinder then being connected to the equivalent chambers of the existing cylinders at the same corner of the vehicle. So, if two rear axles are provided with helper cylinders, the chambers of all those helper cylinders associated with say the back left wheels of the vehicle can be interconnected. Similarly, with two back left roll moment reaction system cylinders, the compression chambers of each should be interconnected and the rebound chambers of each should be interconnected at that corner of the vehicle. Alternatively, the roll stiffness of each axle could be independently controlled to ensure the optimal roll stiffness and roll moment distribution for any given payload and payload position.

Also, from the range of variable roll stiffness and roll moment distribution system solutions shown in this document, and the myriad of other prior art documents published, it will be readily appreciated that there are many different possible sets of hardware which can be used to produce the required result.

The invention claimed is:

1. A method of controlling roll stiffness and roll moment distribution of a suspension system of a vehicle, the suspension system including:
    front and rear vehicle support means for supporting the vehicle and any given load carried by the vehicle, the given load having its centre of mass at a load position, and
    at least one roll moment reaction means providing a variable roll stiffness for the vehicle suspension system, the at least one roll moment reaction means including at least one cylinder and two opposing fluid chambers;
    the method including:
    controlling pressures in the two opposing fluid chambers to set roll moment distribution of the suspension system and set roll stiffness of the at least one roll moment reaction means in dependence on the given load carried by at least the rear or front of the vehicle such that once set, the roll moment and variable roll stiffness is fixed for the given load and load position.

2. A method according to claim 1, including sensing the load on at least the front or the rear support means.

3. A method according to claim 1, wherein the load on at least the front or the rear support means is sensed at two laterally spaced points, thereby enabling calculation of both the vertical load on said support means and the lateral offset of said vertical load from the vehicle centre-line.

4. A method according to claim 2, wherein at least the front or rear support means is at least partially mechanical, a time-averaged displacement of the mechanical support means being measured to thereby sense the load on the mechanical support means.

5. A method according to claim 3, wherein the load on at least the front or the rear support means is at least partially supported by two laterally spaced mechanical support means, a time-averaged displacement of each of said two laterally spaced mechanical support means being measured to thereby sense the load at two laterally spaced points.

6. A method according to claim 2, wherein at least the front or rear support means is at least partially fluid, a time-averaged pressure of the fluid support means being measured to thereby sense the load on the fluid support means.

7. A method according to claim 3, wherein the load on at least the front or the rear support means is at least partially supported by two laterally spaced fluid support means, a time-averaged pressure of each of said two laterally spaced fluid support means being measured to thereby sense the load at two laterally spaced points.

8. A method according to claim 1, wherein the at least one roll moment reaction means includes a front roll moment reaction means for a front pair of wheels and a rear roll moment reaction means for a rear pair of wheels,
the method including adjusting the roll stiffness of the front roll moment reaction means separately to the roll stiffness of the rear roll moment reaction means to thereby control the overall roll stiffness and the roll moment distribution of the vehicle suspension system.

9. A method according to claim 1, wherein the at least one roll moment reaction means includes first and second double-acting cylinders, said cylinders being laterally spaced and connected between an axle of the vehicle and a body of the vehicle, each said double-acting cylinder including a compression chamber and a rebound chamber; and
first and second fluid conduits, the first fluid conduit being connected to the compression chamber of the first double-acting cylinder and the rebound chamber of the second double-acting cylinder, and the second fluid conduit being connected to the compression chamber of the second double-acting cylinder and the rebound chamber of the first double-acting cylinder;
the method including varying the stiffness of said at least one roll moment reaction means by changing static operating pressure of the fluid in the first and second fluid conduits.

10. A method according to claim 9, wherein at least the front or rear vehicle support means includes independent support means providing roll stiffness in addition to heave stiffness and the at least one roll moment reaction means includes a front roll moment reaction means for a front pair of wheels and a rear roll moment reaction means for a rear pair of wheels, the front and rear roll moment reaction means being interconnected such that the roll moment distribution of the roll moment reaction means is substantially constant with varying roll stiffness of the roll moment reaction means,
the method including adjusting both the stiffness of the roll moment reaction means and the independent support means to thereby vary both the roll stiffness and roll moment distribution of the vehicle suspension system.

11. A method according to claim 9, wherein the roll stiffness and roll moment distribution of the vehicle support means is fixed and wherein the at least one roll moment reaction means includes a front roll moment reaction means for a front pair of wheels and a rear roll moment reaction means for a rear pair of wheels, the front and rear roll moment reaction means being interconnected such that the roll moment distribution of the roll moment reaction means is fixed at a value different than that of the vehicle support means,
the method including adjusting the stiffness of the roll moment reaction means to thereby vary both the roll stiffness and roll moment distribution of the vehicle suspension system.

12. A method according to claim 1, wherein the at least one roll moment reaction means is set to react some or all of an offset roll load.

13. A method according to claim 1, wherein the at least one roll moment reaction means includes at least two fluid volumes, each fluid volume including at least one fluid conduit, the method including setting a static operating pressure of each fluid volume independently to react some or all of an offset roll load.

14. A method according to claim 13, wherein the load on at least the front or the rear support means is sensed at two laterally spaced points and both the vertical load on said support means and the offset roll load due to lateral offset of said vertical load from the vehicle centre-line is calculated which also requires the pressure in the conduits of the roll moment reaction means, then setting the pressures in the fluid volumes to thereby set the roll stiffness of the at least one roll moment reaction means and the roll moment distribution of the suspension system and react some or all of the offset roll load.

15. A suspension system for a vehicle having a frame, the suspension system including rear and front vehicle support means for supporting the vehicle and any given load carried by the vehicle, the given load having its centre of mass at a load position; and
at least one roll moment reaction means for providing a variable roll stiffness for the suspension system, the at least one roll moment reaction means including at least one cylinder and two opposing pressure chambers, the at least one cylinder connected to the frame of the vehicle; wherein
the at least one cylinder and two opposing pressure chambers transmits roll force, and
the roll stiffness and the roll moment distribution provided by the suspension system is set in dependence on the given load carried by at least a rear or front of the vehicle such that once set, the roll moment distribution and variable roll stiffness is fixed for the given load and load position.

16. A suspension system according to claim 15, including sensing the load on at least the front or the rear support means.

17. A suspension system according to claim 15, wherein the load on at least the front or the rear support means is sensed at two laterally spaced points, thereby enabling calculation of both the vertical load on said support means and the lateral offset of said vertical load from the vehicle centre-line.

18. A suspension system according to claim 16, wherein at least the front or rear support means is at least partially mechanical, a time-averaged displacement of the mechanical support means being measured to thereby sense the load on the mechanical support means.

19. A suspension system according to claim 17, wherein the load on at least the front or the rear support means is at least partially supported by two laterally spaced mechanical support means, a time-averaged displacement of each of said two laterally spaced mechanical support means being measured to thereby sense the load at two laterally spaced points.

20. A suspension system according to claim 16, wherein at least the front or rear support means is at least partially fluid, a time-averaged pressure of the fluid support means being measured to thereby sense the load on the fluid support means.

21. A suspension system according to claim 17, wherein the load on at least the front or the rear support means is at least partially supported by two laterally spaced fluid support means, a time-averaged pressure of each of said two laterally spaced fluid support means being measured to thereby sense the load at two laterally spaced points.

22. A suspension system according to claim 15 wherein at least one of the roll moment reaction means includes an anti-roll bar assembly between an axle of the vehicle and a body of the vehicle, the stiffness of the anti-roll bar assembly being set as a function of at least the magnitude of the vehicle load on at least one of the rear or front vehicle support means.

23. A suspension system according to claim 22, wherein said at least one roll moment reaction means includes a pressure accumulator connected to each pressure chamber, said stiffness of said anti-roll bar assembly being set by adjusting the operating pressure within the two opposing pressure chambers and the associated accumulators.

24. A suspension system according to claim 15 wherein the at least one roll moment reaction means includes:
   a first and a second double-acting cylinder, said cylinders being laterally spaced and connected between an axle of the vehicle and a body of the vehicle, each of said double-acting cylinders including a compression chamber and a rebound chamber; and
   first and second fluid conduits, the first fluid conduit being connected to the compression chamber of the first double-acting cylinder and the rebound chamber of the second double-acting cylinder, and the second fluid conduit being connected to the compression chamber of the second double-acting cylinder and the rebound chamber of the first double-acting cylinder,
   the stiffness of said at least one roll moment reaction means being varied by changing the static operating pressure of the fluid in the first and second fluid conduits.

25. A suspension system as claimed in claim 24, including a front roll moment reaction means provided on at least a front axle of the vehicle and a rear roll moment reaction means provided on at least a rear axle of the vehicle, the respective front and rear roll moment reaction means including respective front and rear first and second fluid conduits, wherein the static operating pressures in the front and rear first and second fluid conduits are independently controlled as a function of at least the magnitude of the vehicle load on at least one of the rear and one of the front vehicle support means.

26. A suspension system as claimed in claim 24 wherein there is provided at least one fluid accumulator in fluid communication with each compression chamber.

27. A suspension system according to claim 15, wherein the at least one roll moment reaction means includes a front roll moment reaction means for a front pair of wheels and a rear roll moment reaction means for a rear pair of wheels,
   the roll stiffness of the front roll moment reaction means being adjusted separately to the roll stiffness of the rear roll moment reaction means to thereby control the overall roll stiffness and the roll moment distribution of the vehicle suspension system.

28. A suspension system according to claim 24, wherein at least the front or rear vehicle support means includes independent support means providing roll stiffness in addition to heave stiffness and the at least one roll moment reaction means includes a front roll moment reaction means for a front pair of wheels and a rear roll moment reaction means for a rear pair of wheels, the front and rear roll moment reaction means are interconnected such that the roll moment distribution of the roll moment reaction means is substantially constant with varying roll stiffness of the roll moment reaction means,
   the stiffness of both the roll moment reaction means and the independent support means being adjusted to thereby vary both the roll stiffness and roll moment distribution of the vehicle suspension system.

29. A suspension system according to claim 28, wherein a front roll moment reaction means is provided on at least a front axle of the vehicle and a rear roll moment reaction means is provided on at least a rear axle of the vehicle,
   each roll moment reaction means including a first and a second double-acting cylinder, said cylinders being laterally spaced and connected between an axle of the vehicle and a body of the vehicle, each of said double-acting cylinders including a compression chamber and a rebound chamber,
   the respective front and rear roll moment reaction means including respective front and rear first and second fluid conduits, each respective first fluid conduit being connected to the compression chamber of the respective first double-acting cylinder and the rebound chamber of the respective second double-acting cylinder, and the second fluid conduit being connected to the compression chamber of the respective second double-acting cylinder and the rebound chamber of the respective first double-acting cylinder,
   the front first fluid conduit being connected to the rear first fluid conduit by a first longitudinal fluid conduit and the front second fluid conduit being connected to the rear second fluid conduit by a second longitudinal fluid conduit; and
   the rear support means includes:
   a first and a second spring, said first and second springs being laterally spaced and connected between a said axle of the vehicle and a body of the vehicle; and
   a first and a second single-acting fluid helper cylinder, said fluid helper cylinders being laterally spaced and connected between said axle of the vehicle and said body of the vehicle, each said fluid helper cylinder including a helper compression chamber,
   the pressure in each helper cylinder being controlled as a function of at least the load on said axle to thereby provide partial support of the vehicle body and provide increasing roll stiffness to said axle as the load on said axle increases.

30. A suspension system according to claim 24, wherein the roll stiffness and roll moment distribution of the vehicle support means being fixed and
   wherein the at least one roll moment reaction means includes a front roll moment reaction means for a front pair of wheels and a rear roll moment reaction means for a rear pair of wheels, the front and rear roll moment reaction means are interconnected such that the roll moment distribution of the roll moment reaction means is fixed at a value different than that of the vehicle support means, the stiffness of the roll moment reaction means being adjusted to thereby vary both the roll stiffness and roll moment distribution of the vehicle suspension system.

31. A suspension system according to claim 30, wherein a front roll moment reaction means is provided on at least a front axle of the vehicle and a rear roll moment reaction means is provided on at least a rear axle of the vehicle, each roll moment reaction means including a first and a second double-acting cylinder, said cylinders being laterally spaced and connected between an axle of the vehicle and a body of the vehicle, each of said double-acting cylinders including a compression chamber and a rebound chamber; and the respective front and rear roll moment reaction means including respective front and rear first and second fluid conduits, each respective first fluid conduit being connected to the compression chamber of the respective first double-acting cylinder and the rebound chamber of the respective second double-acting cylinder, and the second fluid conduit being connected to the compression chamber of the respective second double-acting cylinder and the rebound chamber of the respective first double-acting cylinder, the front first fluid conduit being connected to the rear first fluid conduit by a first longitudinal fluid conduit and the front second fluid conduit being connected to the rear second fluid conduit by a second longitudinal fluid conduit.

32. A suspension system according to claim 15, wherein the at least one roll moment reaction means reacts some or all of an offset roll load.

33. A suspension system according to claim 15, wherein the at least one roll moment reaction means includes at least two fluid volumes, each fluid volume including at least one fluid conduit, each fluid volume having a static operating pressure which is set independently to react some or all of an offset roll load.

34. A suspension system according to claim 33, wherein the load on at least the front or the rear support means is sensed at two laterally spaced points and both the vertical load on said support means and the offset roll load due to lateral offset of said vertical load from the vehicle centre-line is calculated which also requires the pressure in the conduits of the roll moment reaction means, such that the pressures in the fluid volumes are adjusted to thereby set the roll stiffness of the at least one roll moment reaction means and the roll moment distribution of the suspension system and react some or all of the offset roll load.

35. A method of controlling roll stiffness and roll moment distribution of a passive suspension system of a vehicle, the passive suspension system including:

front and rear vehicle support means for supporting the vehicle and any given load carried by the vehicle, the given load having its center of mass at a load position, and at least one roll moment reaction means providing a variable roll stiffness for the passive suspension system, the at least one roll moment reaction means including at least one cylinder and two opposing pressure chambers;

the method including controlling pressures in the opposing fluid chambers to set roll moment distribution of the passive suspension system and set roll stiffness of the at least one roll moment reaction means in dependence on the given load carried by at least the rear or front of the vehicle such that once set, the roll moment and variable roll stiffness is fixed for the given load and load position.

36. A passive suspension system for a vehicle having a frame, the passive suspension system including rear and front vehicle support means for supporting the vehicle and any given load carried by the vehicle, the given load having its center of mass at a load position; and at least one roll moment reaction means for providing a variable roll stiffness for the passive suspension system, the at least one roll moment reaction means including at least one cylinder and two opposing pressure chambers the at least one cylinder connected to the frame of the vehicle; wherein the at least one cylinder and two opposing pressure chambers transmits roll force, and the roll stiffness and the roll moment distribution provided by the passive suspension system are set in dependence on the given load carried by at least a rear or front of the vehicle such that once set, the roll moment distribution and variable roll stiffness are fixed for the given load and load position.

* * * * *

UNITED STATES PATENT AND TRADEMARK OFFICE
CERTIFICATE OF CORRECTION

PATENT NO. : 7,637,513 B2
APPLICATION NO. : 10/490695
DATED : December 29, 2009
INVENTOR(S) : Kotulla et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 976 days.

Signed and Sealed this

Ninth Day of November, 2010

David J. Kappos
*Director of the United States Patent and Trademark Office*